United States Patent [19]

Luckhardt et al.

[11] Patent Number: 5,636,426
[45] Date of Patent: Jun. 10, 1997

[54] HOLDING DEVICE FOR FASTENING COMPONENTS

[75] Inventors: Heinrich Luckhardt, deceased, late of Frankfurt am Main; Wolfgang Luckhardt, representative, Königstein, both of Germany

[73] Assignee: Multifastener Corporation, Detroit, Mich.

[21] Appl. No.: 307,849

[22] PCT Filed: Apr. 2, 1993

[86] PCT No.: PCT/EP93/00836

§ 371 Date: Feb. 28, 1995

§ 102(e) Date: Feb. 28, 1995

[87] PCT Pub. No.: WO93/19890

PCT Pub. Date: Oct. 14, 1993

[30] Foreign Application Priority Data

Apr. 3, 1992 [DE] Germany .................. 42 11 276.1

[51] Int. Cl.⁶ .................................................. B23P 11/00
[52] U.S. Cl. .................. 29/432; 29/798; 29/243.517; 227/15
[58] Field of Search ................ 29/432, 798, 809, 29/243.517, 243.518, 429, 525.01; 227/10, 15, 52, 150

[56] References Cited

U.S. PATENT DOCUMENTS

| | | | |
|---|---|---|---|
| 1,503,861 | 8/1924 | Stimpson | 83/676 |
| 1,506,788 | 9/1924 | Stimpson | 227/116 |
| 3,061,837 | 11/1962 | Kent | 29/798 |
| 4,454,650 | 6/1984 | Silver | 29/818 |
| 4,607,418 | 8/1986 | Hatner | 29/432 X |
| 4,698,905 | 10/1987 | Taga | 29/798 |
| 5,172,467 | 12/1992 | Muller | 29/798 X |

FOREIGN PATENT DOCUMENTS

| | | |
|---|---|---|
| 539493 | 2/1972 | Germany . |
| 2263648 | 7/1974 | Germany . |
| 8227676 | 3/1985 | Germany . |
| 3820898 | 11/1988 | Germany . |
| 3448219 | 5/1990 | Germany . |
| 3937903 | 5/1991 | Germany . |
| 4211276 | 1/1993 | Germany . |
| 9319890 | 10/1993 | WIPO . |

*Primary Examiner*—Larry I. Schwartz
*Assistant Examiner*—Khan Nguyen
*Attorney, Agent, or Firm*—Howard & Howard

[57] ABSTRACT

This invention describes a retaining device for holding, guiding and self-actuated releasing of assembly and auxiliary assembly parts, such as nuts, bolts, and rivets, in a device for pressing or attaching the parts to sheet metal, illustrated here with nuts as an example. The retaining device is used to hold the nuts in a definite, stable position during their transport from a starting position to the working position. It consists of two retaining catches that are pivotably mounted to the plunger so that they can be pivoted between a closed position in which they hold the nuts against the plunger, and an open position in which they release the nuts. A restricted guidance element for the retaining catches ensures that during an outward thrust movement of the plunger, the retaining catches remain in their closed position and will only be released to pivot into the open position after the plunger has reached the working position.

19 Claims, 5 Drawing Sheets

Fig. 8
Fig. 9
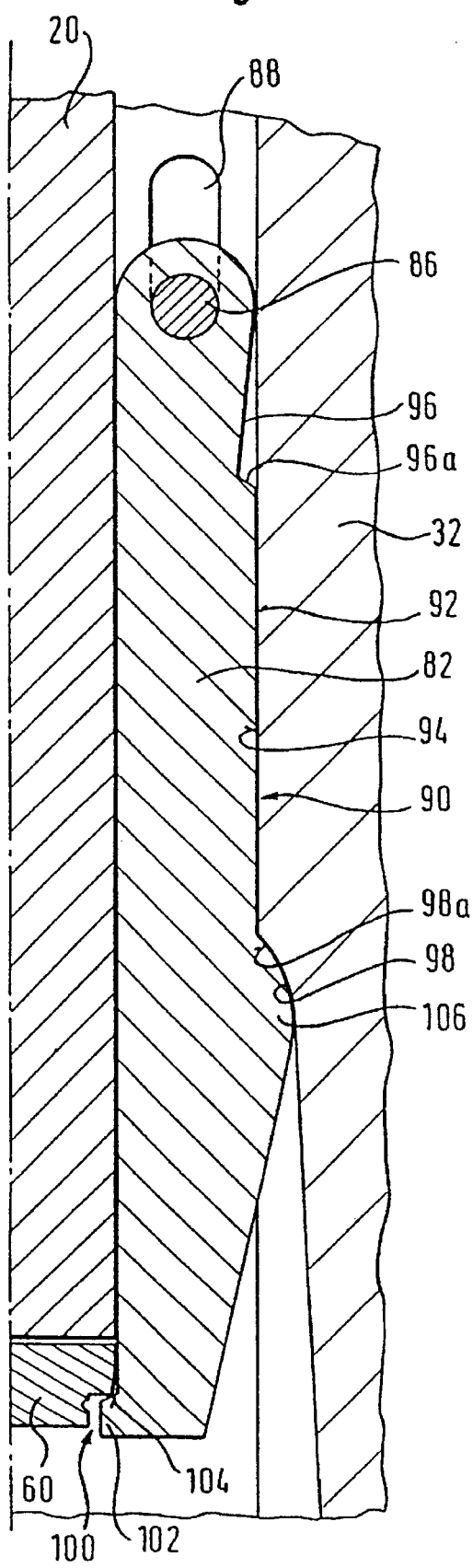
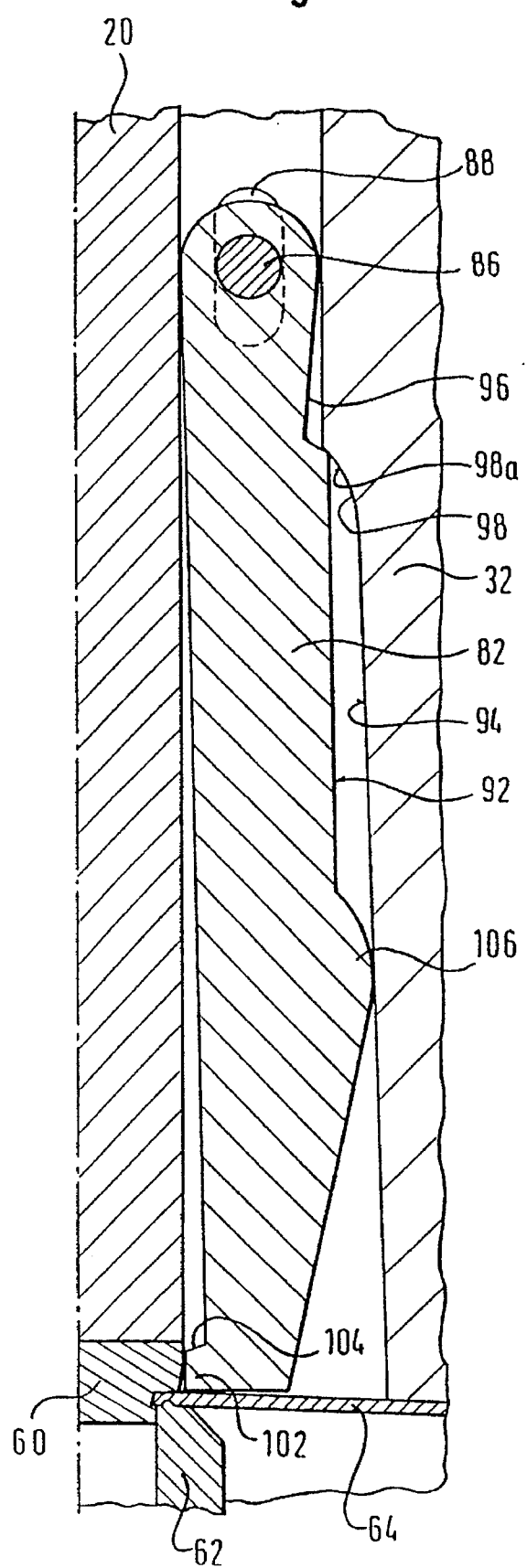

HOLDING DEVICE FOR FASTENING COMPONENTS

BACKGROUND

The invention pertains to a retaining device for holding, guiding and self-actuated releasing of an assembly part, such as a nut or another element in a device for bringing the assembly part to a plate-shaped component, or in another device for precise conveyance of the element.

A retaining device of this type for a punching mechanism for pressing a nut into sheet metal is known for example from DE-PS 1,254,940 and is widely used in practice. In this punching mechanism the sliding unit forms the press plunger, which is mounted to a housing securely joined to the upper part of the press, and this sliding unit extends into the channel of the guide piece in order to feed the nut through the channel to the work position and to press it into the sheet metal resting on a bottom die. The guide piece is moved laterally up to a guide stud located off-center with respect to the housing; said guide stud can slide relative to the upper part of the press against the pretension of the helical compressed springs. The retaining device consists of two retaining catches that are articulated at the guide piece in the region of the feeding opening and block any downward motion of the nut, until the plunger moves downward and thereby pivots the two retaining catches into their open position. The nut then moves in the channel from the initial position down to the working position without being guided and positioned, except by the channel walls.

Therefore misalignments, slanted positions or other positioning inaccuracies can occur that result in corresponding errors during the assembly process. Additional disadvantages of the known device are that they require a relatively large manufacturing effort, a large number of individual parts and also a considerable space requirement.

SUMMARY OF THE INVENTION

The invention is based on the problem of refining a retaining device, so that it ensures a precise positioning of the joined part or of the element to be moved to the work position with relatively little construction effort.

In a retaining device designed according to this invention, the retaining catches are not moved up to the guide piece, but rather are pivotably mounted to the sliding part, so that they move along with the sliding part. Due to the forced guidance provided by this invention, they are held in their closed position during an outward movement of the sliding part until the sliding part reaches the working position, where then the forced guide releases the retaining catches to pivot outward into the open position.

This will ensure that the element taken along by the sliding part is transported directly up to the working position in a definite, stable manner, so that the number of possible errors in the processing occurring at the working position will be reduced significantly. Thus, identical transport and working sequences are always guaranteed. All these advantages are obtained with comparatively little construction expenditure.

Due to the invention and its favorable embodiments the following specific advantages are attained:

- Restricted guidance and thus high positioning accuracy of the elements being moved from their initial position to the working position
- compact design with little space requirement
- use of simple construction elements
- small number of construction elements
- simple rotational lock and precise alignment of the control system
- no maintenance (lubrication) due to suitable material pairing
- easy exchange of the device formed according to the invention using already existing tools.

The retaining device designed according to this invention is suitable in particular for use in a device for pressing in or mounting assembly parts and auxiliary assembly parts, for example, nuts, bolts and rivets, in plate-shaped assemblies. However in principle, it can be used for any kind of device in which the elements must be transported from a starting position in precise alignment to a working or transfer position.

BRIEF DESCRIPTION OF THE DRAWINGS

One application example of the invention will be explained in greater detail based on the figures. The figures show:

FIGS. 8,9 Enlarged detailed views of the retaining device in its closed and open positions;

DETAILED DESCRIPTION OF THE INVENTION

Figure 1:
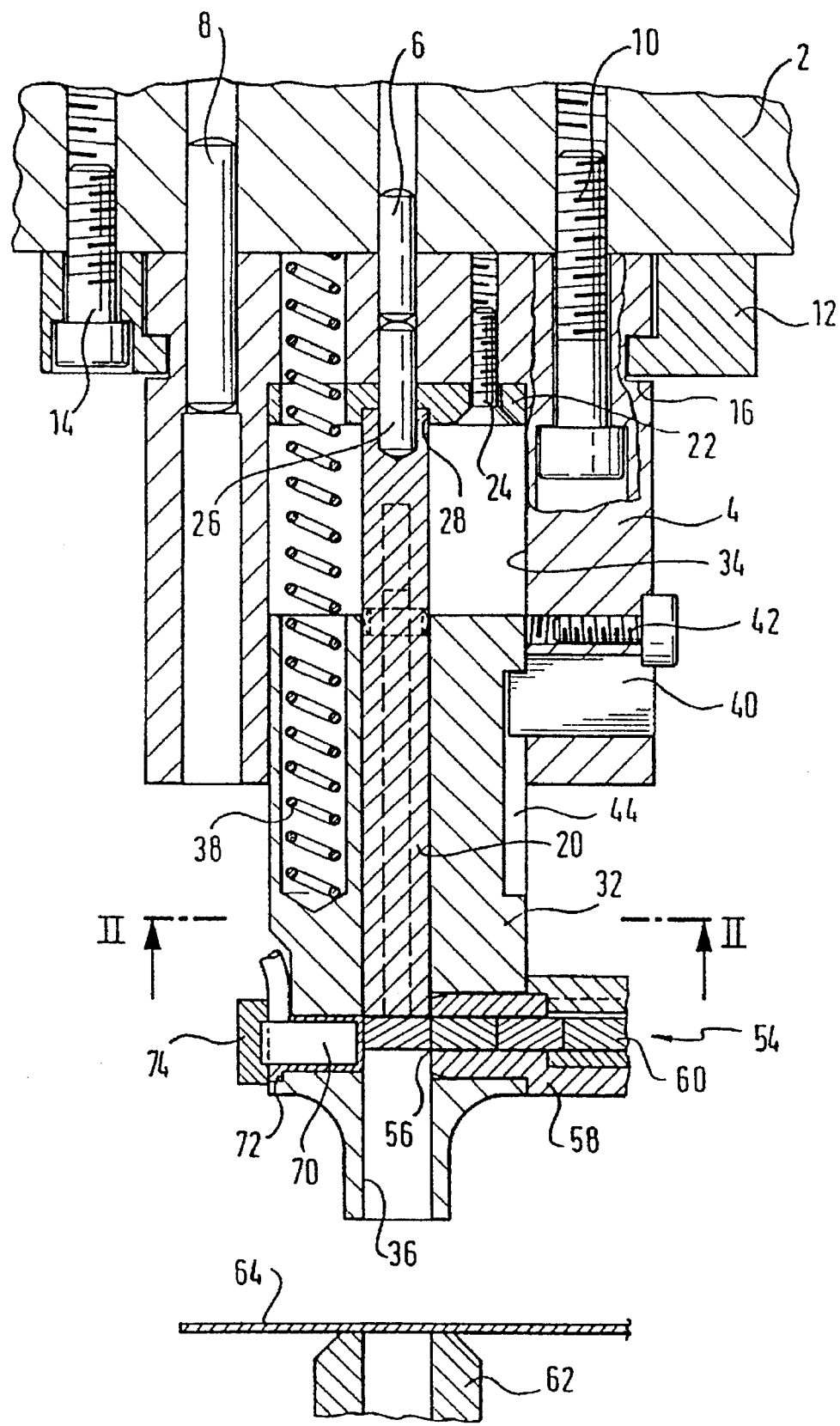
FIG. 1 A longitudinal cross section through a punching device for pressing a nut into a piece of sheet metal.

The punching mechanism shown in FIG. 1 features an upper press part 2 that can be moved up and down by an actuator (not illustrated). A housing 4 is positioned by centering pins 6,8 at the upper press part 2 and is tightened against the lower side of the upper press part by means of two screws 10 or optionally by two clamping catches 12. The clamping catches 12 have protrusions that engage into transverse grooves 16 of the housing and are attached by screws 14 to the upper press part 2.

A plunger 20 (also designated as the sliding part in the claims) is securely attached to the housing 4 with a pressure plate 22 located between. The pressure plate 22 is attached by two screws 24 to housing 4, and plunger 20 is attached by two screws 30 to housing 4 (see also FIG. 3). A centering pin 26 that penetrates the pressure plate 22 and extends into the hole of housing 4 holding the centering pin 6 provides the positioning relative to housing 4 for both the plunger 20 and also for the pressure plate 22.

A guide piece 32 is mounted in a guide opening 34 located centrally in housing 4 to be longitudinally slidable. In the middle of guide piece 32 there is a channel 36 and the plunger 20 can slide within it so that the plunger 20 will slide in channel 36 during any relative shift in position between the sliding piece 32 and the housing 4.

The guide piece 32 is held under tension by four helical compression springs 38 distributed around the plunger 20 within the guide opening 34 and braced against the upper press part; the tension is applied in a direction away from the upper press part 2. A locking bolt 40 held in place by a locking screw 42 at the housing 4 has a protrusion that extends into a slot 44 of the guide piece 32 to limit the outward movement of the guide piece 32 caused by the springs 38.

The plunger 20 and the channel 36 have the same rectangular cross section. The guide piece 32 also has the same rectangular cross section as the guide opening 34. Thus a precise control and positioning of the plunger 20 relative to the guide piece 32 and of the guide piece 32 relative to the housing 34 will be assured. At the same time, the choice of this cross-sectional shape achieves a simple rotational lock of the plunger 20 and of the guide piece 32.

Figure 2:
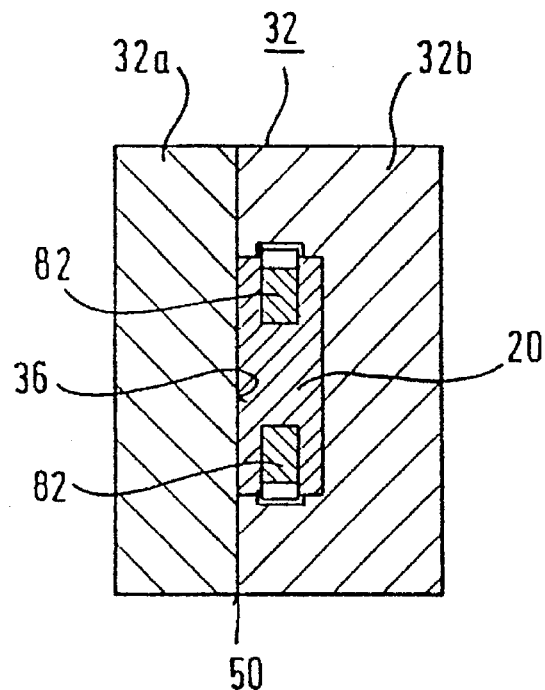
FIG. 2 A cross section along the line II—II in FIG. 1.
Figure 3:
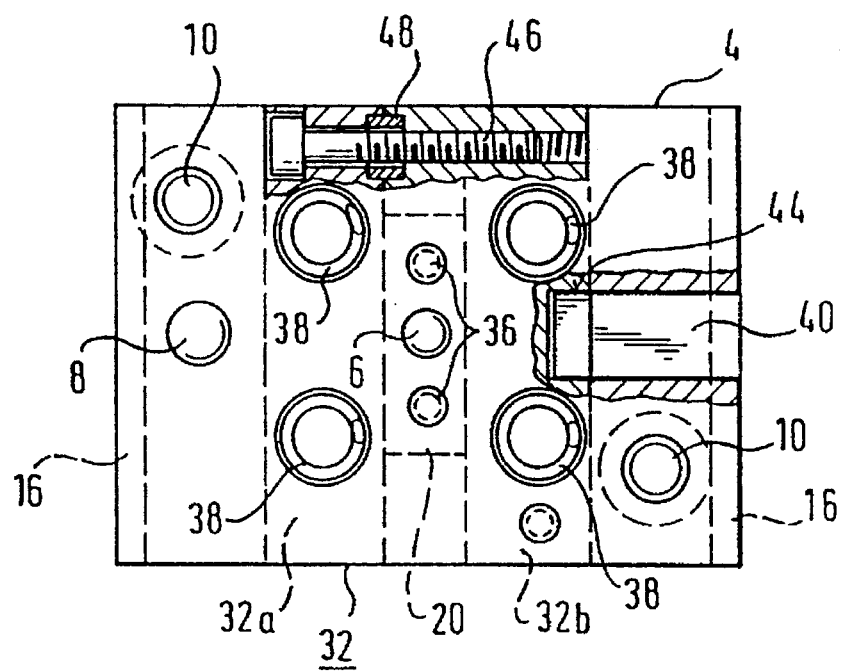
FIG. 3 A partially cutaway plan view of the housing of the punching device in FIG. 1.

As is seen in particular in FIG. 2, the guide piece 32 is divided in a plane 50 that coincides with one side wall of the channel 36. As is shown in FIG. 3, the two parts 32a and 32b of guide piece 32 are held together by screws 46 and centering casing 48. The two-part division of the guide piece 32 simplifies the manufacture of the channel 36.

A nut feeding device 54 (not shown in detail) with an inlet line 58 is laterally mounted on the guide piece 32; said inlet line pushes nuts 60 into the channel 36 by means of a lateral inlet opening 56. Below the guide piece 32 there is a stationary bottom die 62 on which a plate-shaped component 64 made of sheet metal rests; the nuts 60 resting in the channel 36 should be pressed into the sheet metal by means of an upward movement of the upper press part 2. During an upward movement of the type described above for the upper press part 2, as soon as its lower side touches the sheet metal 64, the guide piece 32 will be displaced relative to the housing 4 and relative to the plunger 20, so that the plunger 20 will push the nut 60 resting in the channel 36 from the starting position adjoining the inlet opening 56, downward through the channel to the working position on the sheet metal 64.

Based on the simple rotation-locked control of the guide piece 32 in the guide opening 34 and of the plunger 20 in the channel 36 described above, a positionally accurate alignment of the channel 36 to the stationary bottom die 62 is obtained. This is important especially when the joined parts to be processed, such as rectangular nuts, must be pressed into the sheet metal 64 in positionally accurate alignment or are to be attached to it in another manner.

It is preferable that the parts sliding with respect to each other, such as the housing 4, the guide piece 32 and the plunger 20, be made of materials that do not require lubrication. For example, the housing 4 and the guide piece 32 can be manufactured as cast in bronze articles, while the plunger 20 can consist of a tool steel.

On the other side of the channel 36 opposite the inlet opening 56, there is a proximity switch 70 that ascertains the proper location of the nut 60. The proximity switch 70 is located in a protective dome 72 that prevents the nuts from damaging the proximity switch 70. The proximity switch 70 and the protective dome 72 are attached by a clamp plate 74 to the guide piece 32.

Figure 4:
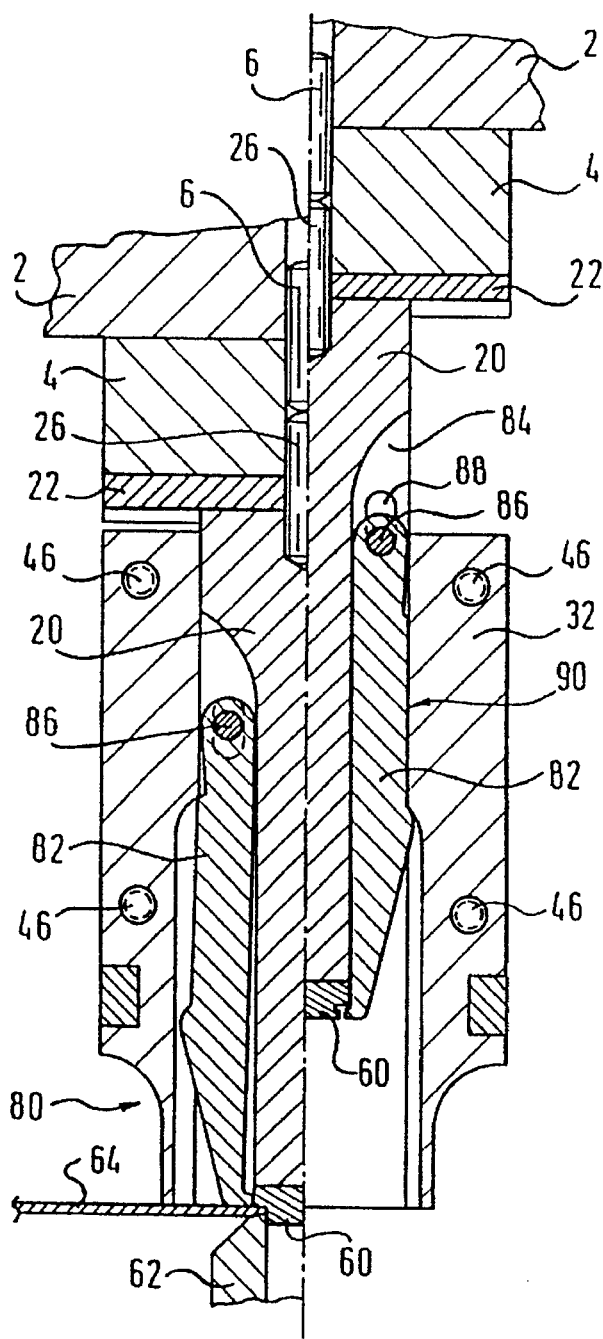
FIG. 4 A longitudinal cross section through the retaining device of the punching mechanism in FIG. 1, where the retaining device is shown in various operating states in the left and right sides of FIG. 4.

As is shown in particular in FIGS. 4, 8 and 9, a retaining device 80 is rovided that holds the nut 60 precisely in its position during its travel from the starting position (right side in FIG. 4) to the working position (left side in FIG. 4). The retaining device 80 consists of two retaining catches 82 that are positioned in longitudinal grooves 84 of the plunger 20 and are pivotably mounted by bearing bolts 86 in longitudinal holes 88 of the plunger 20. Thus the retaining catches 82 can pivot between a closed position in which they hold the nuts in contact with the lower end of the plunger 20 (right side of FIG. 4, FIG. 8) and an open position in which they release the nuts (left side of FIG. 4, FIG. 9), as will be explained in detail below.

A restricted guidance element 90 is provided for the retaining catches 82; said element holds the retaining catches 82 in the closed position during a movement of the plunger 20 and thus of the nut 60 from the initial position to the working position. As is indicated in detail in FIGS. 8 and 9, the restricted guidance element 90 consists of guide surfaces 92,94 provided at the retaining catches 82 and the guide piece 32; said surfaces slide against each other during a relative movement between the guide piece 32 and the plunger 20. At the upper end of the guide surface 92 and at the lower end of the guide surface 94 there are an offset 96 in the retaining catch 82 and an offset 98 in the guide piece 32, respectively, which allow the retaining catch 82 to pivot outward into the open position (left side of FIG. 4, FIG. 9) when the plunger 20 and thus also the nut 60 have reached the working position. The offsets 96 and 98 are provided with slanted surfaces 96a and 98a that pivot the retaining catches 82 back into their closed position during the withdrawal movement of the plunger 20.

Figure 7:
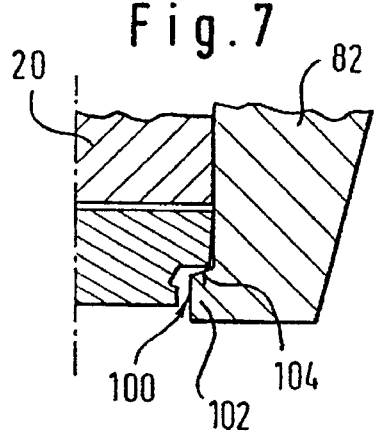

As is shown in particular in FIGS. 7 and 8, the nut 60 is held in the closed position of the retaining catches 82 by a slanted surface connection 100 with the plunger 20. The slanted surface connection 100 is formed by slant surfaces 104 provided at retaining hubs 102 of the retaining catches 82; said slant surfaces are in contact with one edge of the nut 60 and after a relative longitudinal shift between the retaining catches 82 and the plunger 20 made possible by the longitudinal hole connection 86,88, the retaining catches pivot outward, as will be explained in greater detail below.

The operation of the described device will now be explained.

FIG. 1 shows the initial state in which a nut 60 is pushed from the nut feeding device 54 into the channel 36, specifically between the lower side of the plunger 20 and the slanted surface 104 of the retaining hubs 102 of the retaining catches 82, which are found in their closed position (right side of FIG. 4, FIG. 8). Now if the upper press part 2 with its attached parts is moved downward, then initially, the lower side of the guide piece 32 rests against the sheet metal 64 resting on the bottom die 62. During an additional downward movement of the upper press part 2, the guide piece 32 slides against the tension force of the springs 38 into the guide opening 34, while at the same time the plunger 20 slides downward in channel 36. In doing so, it will move the nut 60 located in the channel 36 from its starting position up to the working position against sheet metal 64. During this entire downward movement, the nut 60 is held firmly in position by the retaining catches 82; said catches are prevented from pivoting out due to the restricted guidance element 90 in the form of guide surfaces 92 and 94.

Now once the plunger 20 has reached the working position, then first the retaining catches 82 protruding over the plunger 20 and also over the nut 60 are set down onto the sheet metal 64. At the same time, the offsets 96 of the retaining catches 82 reach the offsets 98 in the guide piece 32. Furthermore, since the retaining catches 82 and the plunger 20 can execute a limited longitudinal displacement due to the longitudinal hole connection 86,88, the plunger 20 with the nut 60 will continue to move farther downward. In doing so, by means of the slanted surfaces 104 the nut 60 presses the retaining catches 82 outward to their open position, which is made possible by the offsets 96,98 (FIG. 9). The nut 60 will thus be released by the retaining catches 82, so that they can be pressed into the sheet metal 64 by the plunger 82 [sic]. During the press process as well, the nut 60 remains locked in position by contact with the retaining hubs 102 of the retaining catches 82.

After completion of the pressing process, if the upper press part 2 and thus also the plunger 20 are moved back again, then the slanted surfaces 96a,98a of the offsets 96,98 will pivot the retaining catches 82 back to their closed position. A protruding cam 106 located at the retaining catches 82 cooperates with a cam surface, which is shaped like slanted surface 98a of the guide piece 32, during the withdrawal movement, to return the retaining catches 82 back to the longitudinal direction. Then a new punching process can begin.

Figure 5:
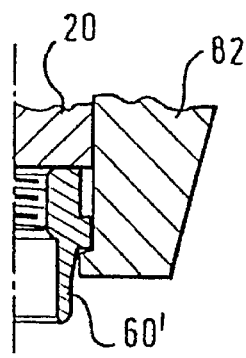
FIGS. 5–7 Various elements that can be processed with the retaining device of FIG. 4.

Conventional nuts with rectangular cross section (FIG. 7) can be handled with the described device. Instead of this, nuts 60 (FIG. 5) with round cross section can also be handled. In this case the retaining catches could have a rounded shape in the region adjoining the nut 60 with said shape being adapted to the cross section of the nut 60'. In addition, more than two, e.g., three or four, retaining catches could be used.

Figure 6:
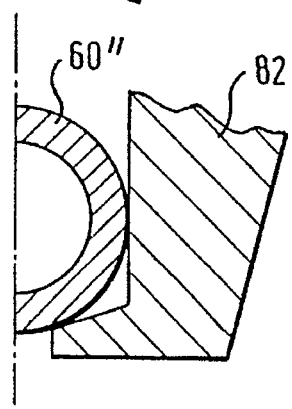

As is indicated in FIG. 6, the described retaining device could also be used for holding and transporting other elements 60" of any shape, provided a precise positioning is important in the transport of the elements 60".

As already mentioned above, the described retaining device can be used for any devices where the elements have to be transported from an initial position in precise alignment to a working or transfer position. For example, the described retaining device can be used in an electric welding device for welding a nut or another element to a plate-shaped component. In a design of this type, the plunger 20 is used as one electrode and the stationary bottom die 62 serves as second electrode. In this case there will be no punching through the sheet metal part 64, since the bottom die 62 is of solid, i.e., without a drilled hole, design. The plunger 20 used as electrode merely has to apply the contact force necessary for welding. Quite obviously in this case, power feeds for the electrodes, cooling channels, insulation, etc., are provided.

Figure 10:
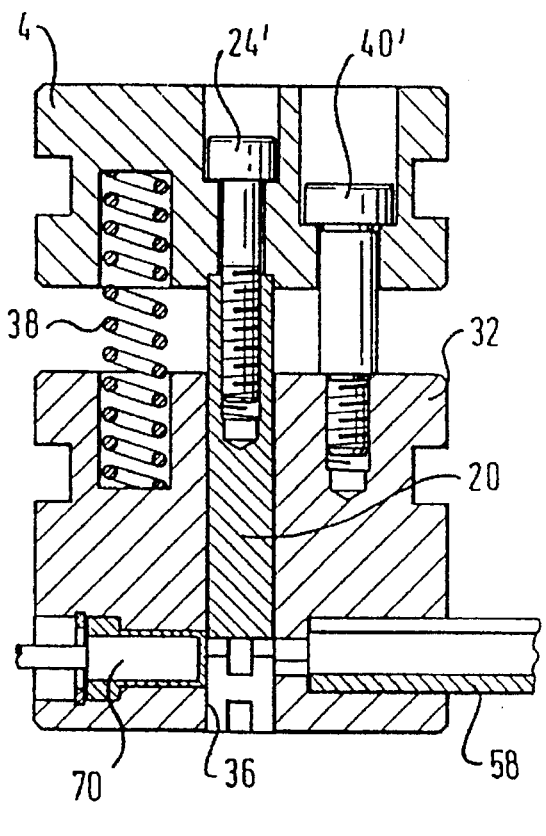
FIG. 10 A longitudinal cross section through another application example of a punching mechanism with a retaining device designed according to this invention.
Figure 11:
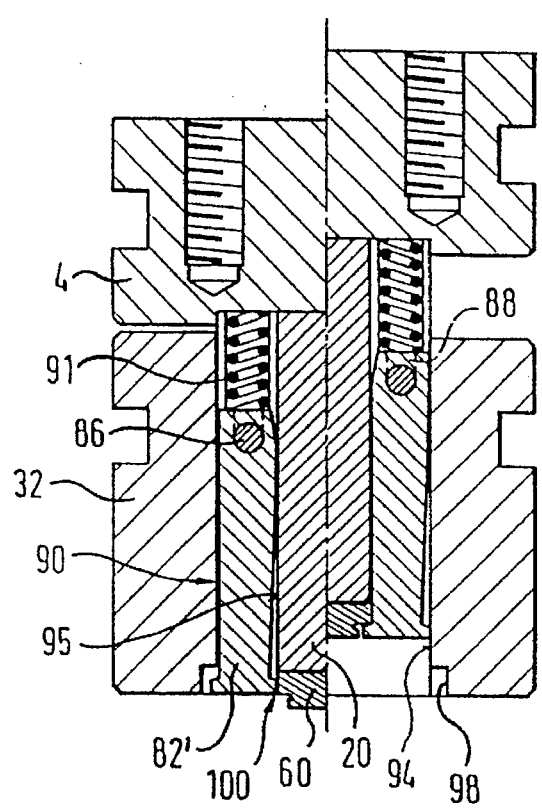
FIG. 11 A longitudinal cross section through the punching mechanism offset by 90° with respect to FIG. 10, where the retaining devices of the left and right halves are shown in different operating states.
Figure 12:
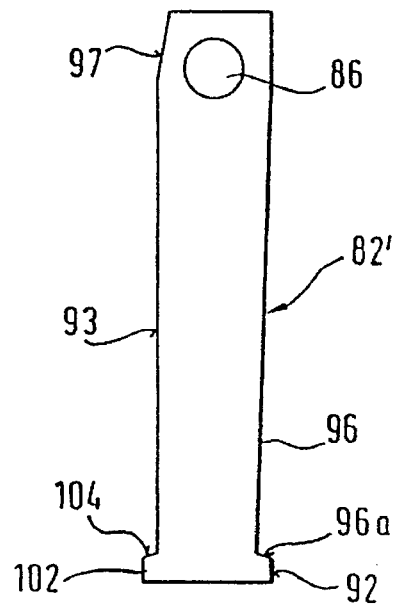
FIG. 12 A detailed view of a retaining catch according to FIG. 11 shown on an enlarged scale.

FIGS. 10–12 show another application example of a punching device for pressing nuts into sheet metal; this design uses a somewhat differently configured retaining device. In FIGS. 10–12 the same reference numbers are used as in the preceding figures, when they correspond to or are associated with the same designated components.

As is evident in FIG. 10, the guide piece 32 of the punch mechanism is not guided in the housing 4; rather both components 4 and 32 have the same outside dimensions and are positioned vertical to each other. Control of the guide piece 32 relative to the housing 4 is performed by the plunger 20, which is held in place in the housing 4 by means of a central screw 24'. Screws 40' are used to limit the lift during a relative displacement between the guide piece 32 and the housing 4.

The retaining device that holds the nut 60 in position during its movement in the guide channel 36 has in principle the same design as the retaining device of the previous figures. However, it does differ in the following properties. Instead of the cam device 98a,106 shown in FIGS. 8 and 9, according to FIG. 11, springs 91 are used that are braced against the housing 4 and tension the retaining catches 82' downward (in the figures) in the longitudinal direction. The springs 91 thus ensure the restoring force for the retaining catches 82' into the longitudinal holes 88 when the plunger is moved back upward again together with the retaining catches 82' after pressing in the nut 60.

Since in the application example of FIGS. 10–12, no cam protrusion 106 is used, the offset 98 provided at the lower end of the guide surface 94 of the guide piece 32 can be reduced to a short length. Accordingly the guide surface 92 of a particular retaining catch 82' (whose upper end adjoins the offset 96), can be limited to a short axial length at the lower end of the particular retaining catch 82'. To allow the retaining catches 82' to pivot outward at the end of their downward movement (left side of FIG. 11), the retaining catches 82' are each provided with a chamfer 97 located on their inner sides in the region of the contact surfaces 93 and 95. This chamfer runs upward at a slant from the contact surface 93 at the level of the bolt 86.

The operation of the retaining device shown in FIG. 11 is in principle the same as that of the retaining device according to the preceding figures, except that the retaining catches 82' are returned by the springs 91 into their longitudinal holes relative to the plunger 20 when the plunger 20 is moved backward after completion of the pressing process and the retaining catches 82' are pivoted inward.

We claim:

1. A method of attaching a fastener to a workpiece using an installation head, said installation head having a passage for receipt of an individual fastener, a plunger reciprocally mounted in said passage for engaging said fastener to attach said fastener to said workpiece and holding devices operatively associated with said plunger, said method comprising the steps of:

introducing a fastener in said passage:

holding said fastener with said holding devices within said passage and moving and guiding said fastener through said passage to said workpiece;

simultaneously engaging said fastener with said plunger while holding said fastener with said holding devices to ensure continued and proper alignment of said fastener with respect to said workpiece and said plunger during movement of said fastener;

releasing said fastener from said holding devices as said plunger continues to engage and complete the attachment of said fastener to said workpiece;

retracting said plunger within said passage and introducing another fastener.

2. The method of claim 1, further including steps of:

engaging said workpiece with said holding devices and thereafter engaging said workpiece with said fastener;

substantially releasing said holding devices from said fastener after said fastener engages said workpiece.

3. The method of claim 2, further including the step of engaging said holding devices beneath said fastener to hold said fastener as said fastener travels through said passage towards said workpiece; pivoting said holding devices from beneath said fastener as said fastener engages said workpiece while still engaging said fastener with said holding devices as said fastener is attached.

4. The method of claim 2, further including the step of pivoting said holding devices between said holding and releasing positions.

5. The method of claim 3, further including the step of moving said holding devices longitudinally with respect to said plunger.

6. The method of claim 1, wherein said installation head includes holding devices operatively associated with said plunger, said holding devices having a body portion and a toe portion, said toe portion extending inwardly in the direction of said fastener for supporting said fastener, said toe portion having a laterally extending surface upon which said fastener rests, said method further including the step of: engaging said fastener against said inclined surface to cam said holding device away from said fastener as said fastener is driven into said workpiece.

7. The method of claim 1, further including the steps of initially spacing said plunger from said fastener.

8. A method of attaching a self-attaching fastener to a plastically deformable metal panel in an installation head, said method including the steps of providing an installation head having a fastener feed passage intersecting a plunger passage, a plunger reciprocating in said plunger passage and a fastener retainer support configured to receive said self-attaching fasteners located in said plunger passage and reciprocate with said plunger:

moving a self-attaching fastener through said feed passage into said plunger passage onto said fastener retainer support;

reciprocating said plunger and said fastener retainer support with said self-attaching fastener supported thereon through said plunger passage toward said panel until said self-attaching fastener engages said panel, said fastener retainer support guiding and supporting said self-attaching fastener through said plunger passage; and then substantially simultaneously causing said fastener retainer support cooperating with a guiding element having an inner surface associated with said plunger passage to release said fastener and driving said plunger against said self-attaching fastener to install said fastener in said panel.

9. A fastener installation head comprising:

a guide element provided with a channel and a feed opening, said feed opening supplying individual fasteners to said channel;

at sliding element which may be displaced longitudinally in said channel by relative movement between said guide element and said sliding element to displace said fastener from a starting position adjacent to said feed opening to a position where said fastener is installed into a workpiece opposite said channel;

at least two holding claws pivotally operatively mounted upon said sliding element, said holding claws pivoting between a closed position to hold said fastener as said fastener is displaced from said starting position adjacent to said feed opening to it position where the fastener initially contacts said workpiece and to pivot to an open position its aid fastener is connected to aid workpiece by said sliding element;

guides positioned within said guide element adjacent to and engaging said holding claws to control the pivotal movement of said holding claws as said sliding clement is displaced longitudinally within said channel, such that said holding claws continually engage and support said fastener;

whereby said fastener is accurately graded through said guide element and accurately connected to said workpiece.

10. The installation head of claim 9, wherein said guides and said holding claws include mating guide surfaces, said mating guide surfaces being in sliding contact during movement between said guide element and said sliding element to control pivotal movement of said holding claws.

11. The installation head of claim 10, wherein said guide surfaces are contoured to provide controlled contact between said holding claws and said fastener and to allow control of the pivotable movement of said holding claws outwardly from said fastener as said fastener contacts said workpiece and inwardly as said guide element moves away from said workpiece.

12. The installation head of claim 9, wherein said holding claws are mounted for relative longitudinal movement with respect to said sliding element.

13. The installation head of claim 9, wherein said holding claws have longitudinally extending oblong openings through which they are mounted to said sliding element whereby said holding claws have limited longitudinal movement with respect to said sliding element.

14. The installation head of claim 9, wherein said holding claws extend beyond said sliding element in the longitudinal direction so that said holding claws contact said workpiece before said fastener during movement of said sliding element.

15. The installation head of claim 9, wherein said holding claws extend beyond said sliding element in the longitudinal direction and contact the workpiece initially during movement of said sliding element, such that said holding claws are longitudinally displaced during relative movement of said sliding element and said guide element by impacting against said workpiece to facilitate outward pivotal movement of said holding claws.

16. The installation head of claim 9, wherein said holding claws have a body portion and a toe portion, said toe portion extending inwardly in the direction of said fastener for supporting said fastener, said toe portion having a laterally extending surface upon which said fastener rests, said surface being inclined away from said body portion whereby said fastener engages said inclined surface to cam said holding claw away from said fastener as said fastener is driven into said workpiece.

17. The installation head of claim 10, wherein said mating guide surfaces include a cam projection and a mating cam surface which interact to reset said holding claws as said guide element moves away from said workpiece.

18. The installation head of claim 9, wherein said holding claws are prestressed in the longitudinal direction with respect to said sliding element by springs such that said holding claws are reset relative to said sliding element by the force of said springs during retraction movement of said sliding element.

19. The installation head of claim 9, wherein said holding claws are mounted within longitudinally extending grooves formed into said sliding element.

* * * * *